Jan. 4, 1938.    C. D. LAKE    2,104,542

AUTOMATIC PUNCHING MACHINE

Filed Oct. 9, 1934    7 Sheets-Sheet 1

INVENTOR.
Clair D. Lake
BY
A C Mabry
ATTORNEY

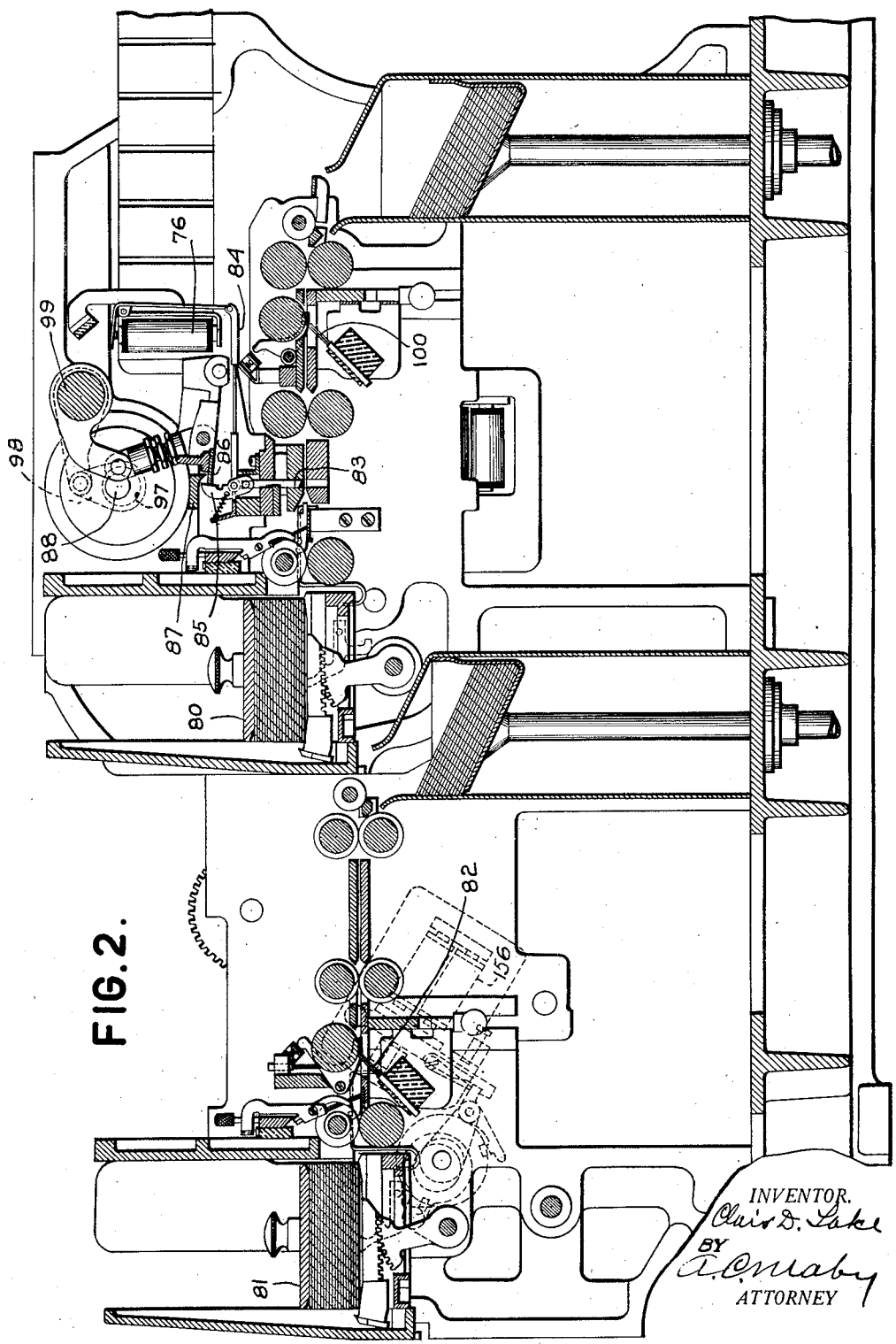

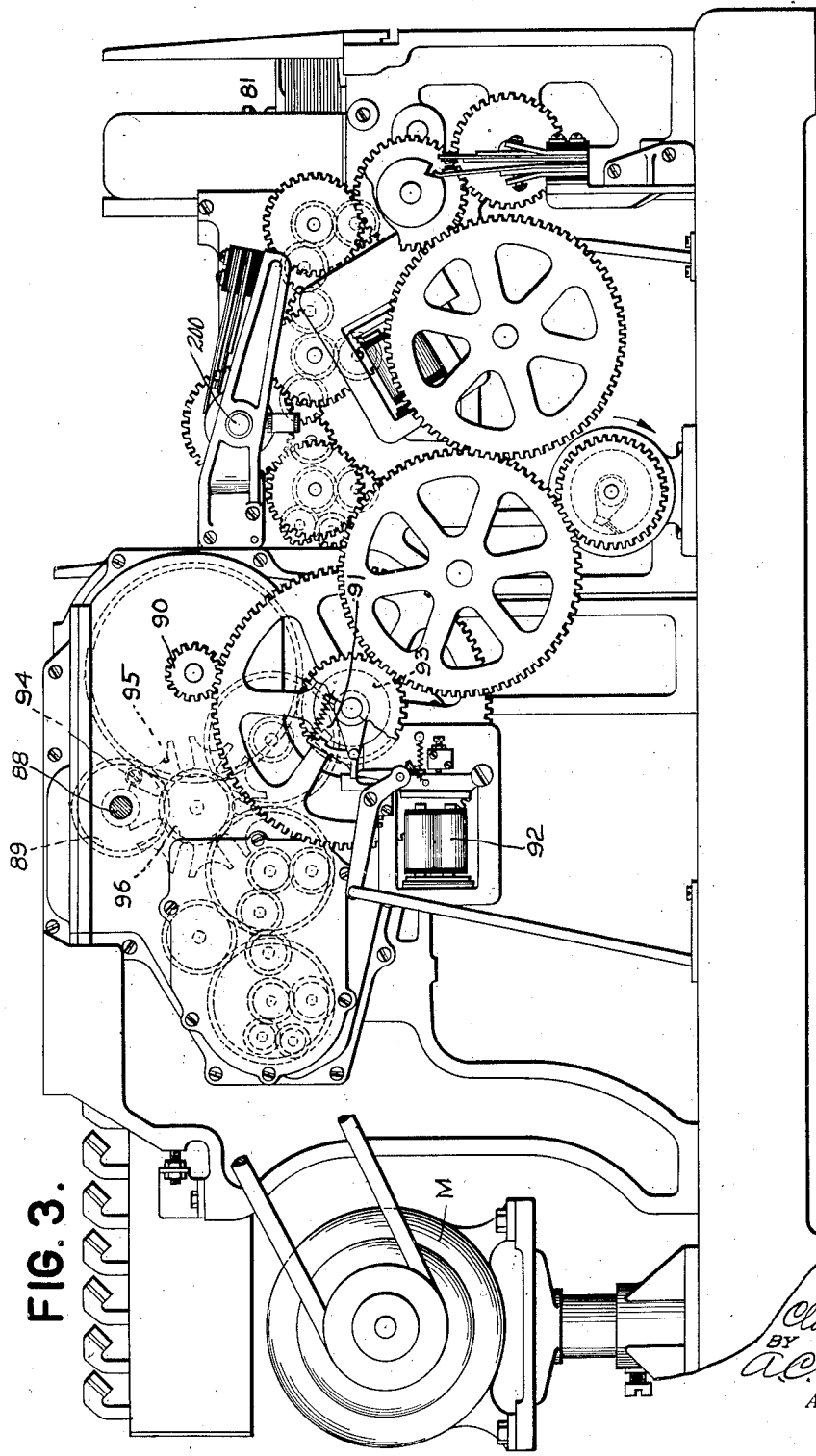

Jan. 4, 1938. C. D. LAKE 2,104,542
AUTOMATIC PUNCHING MACHINE
Filed Oct. 9, 1934 7 Sheets-Sheet 4
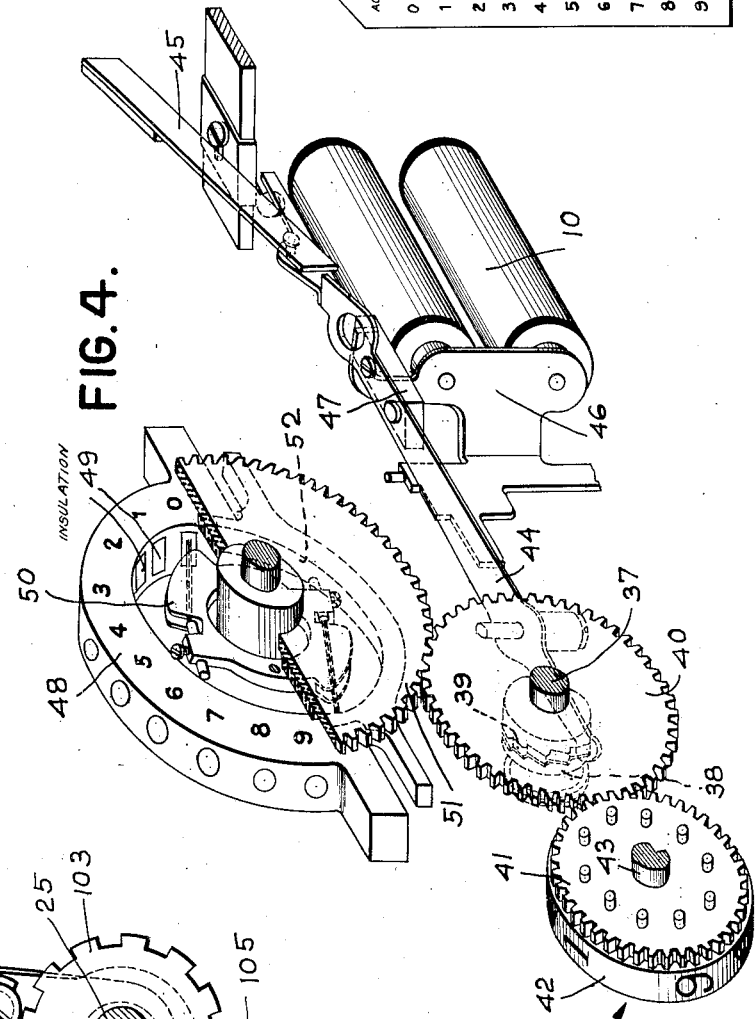

Jan. 4, 1938.     C. D. LAKE     2,104,542
AUTOMATIC PUNCHING MACHINE
Filed Oct. 9, 1934     7 Sheets-Sheet 5

INVENTOR.
Clair D. Lake
BY A. C. Maby
ATTORNEY.

Jan. 4, 1938.                C. D. LAKE                2,104,542
                       AUTOMATIC PUNCHING MACHINE
                  Filed Oct. 9, 1934        7 Sheets-Sheet 7

INVENTOR
Clair D. Lake
BY
ATTORNEY

Patented Jan. 4, 1938

2,104,542

UNITED STATES PATENT OFFICE 2,104,542

AUTOMATIC PUNCHING MACHINE

Clair D. Lake, Binghamton, N. Y., assignor to International Business Machines Corporation, New York, N. Y., a corporation of New York Application October 9, 1934, Serial No. 747,524

1 Claim. (Cl. 235—61.10)

This invention relates to accounting machines and more particularly to machines of the record controlled type.

The principal object of the invention is to provide an improved accounting system in which a controlling accounting machine may be associated with a punching machine for punching data in record cards under control of a tabulating machine.

Another object resides in the provision of a punching machine of the type in which corresponding index point positions of a record card are concurrently perforated, which machine may be remotely controlled by an accounting machine of the tabulator type and in which, through improved mechanism, the machines need not be synchronous in their operation.

The tabulating machine is adapted to analyze groups of record cards and accumulate and print totals in accordance with the analysis of the record cards. The cards are usually arranged in groups and after the complete analysis of each group, a total printing cycle of operations is initiated, during the first half of which the total for the group is printed and during the second half, the accumulators are reset or zeroized. In the present invention, provision is made for interrupting the total taking cycle after the completion of the first half thereof, before resetting operations take place, and for initiating the operation of the punching machine to automatically punch in a record card the total standing on the accumulators, thereby preparing a so-called "summary" or "total" card. Immediately following the initiation of the punch operation, the tabulator resumes functioning and the accumulator resetting mechanism commences to operate and continues to do so concurrently with the operation of the punching machine so that total punching takes place while the accumulators are being reset.

The punch is provided with record analyzing mechanism for analyzing a perforated card for each operation of the machine and may be caused to reproduce the analyzed data in the summary card concurrently with the punching of the total therein.

Other summary card punching systems have been devised in which, upon a group change, the operation of the tabulator is suspended to delay the usual total printing and resetting operations and to permit automatic punching of the total, following the completion of which, total printing and resetting are resumed. Such arrangements are time consuming since the tabulator must remain idle for the duration of the punching operation. With the present arrangement, punching takes place substantially concurrently with the usual resetting operation with but a slight additional time interval to permit the punching machine to effect a slight advance before the resetting operations start.

Still other systems have been devised in which the punching mechanism is incorporated in the design of the tabulator so that punching and printing take place simultaneously. In such machines the punch is an integral part of the structure and cannot be operated independently of the tabulator. The present arrangement retains all the flexibility of the two-unit system wherein the tabulator and punching machine may each be independently operated to perform independent tabulating or punching operations while approaching to a marked degree the time-saving advantages of the single unit arrangement without the incident complicated mechanical interconnections.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a central section of the punching machine.

Fig. 3 is an outside view of the punching machine looking from the opposite direction to that from which Fig. 2 is taken.

Fig. 4 is an isometric of one denominational order of an accumulator.

Fig. 4a is a detail of an accumulating wheel and its resetting pawl.

Fig. 5 is a fragment of a record card.

Fig. 6 is a detail of the total taking cycle controlling clutch of the tabulator.

Figure 7:
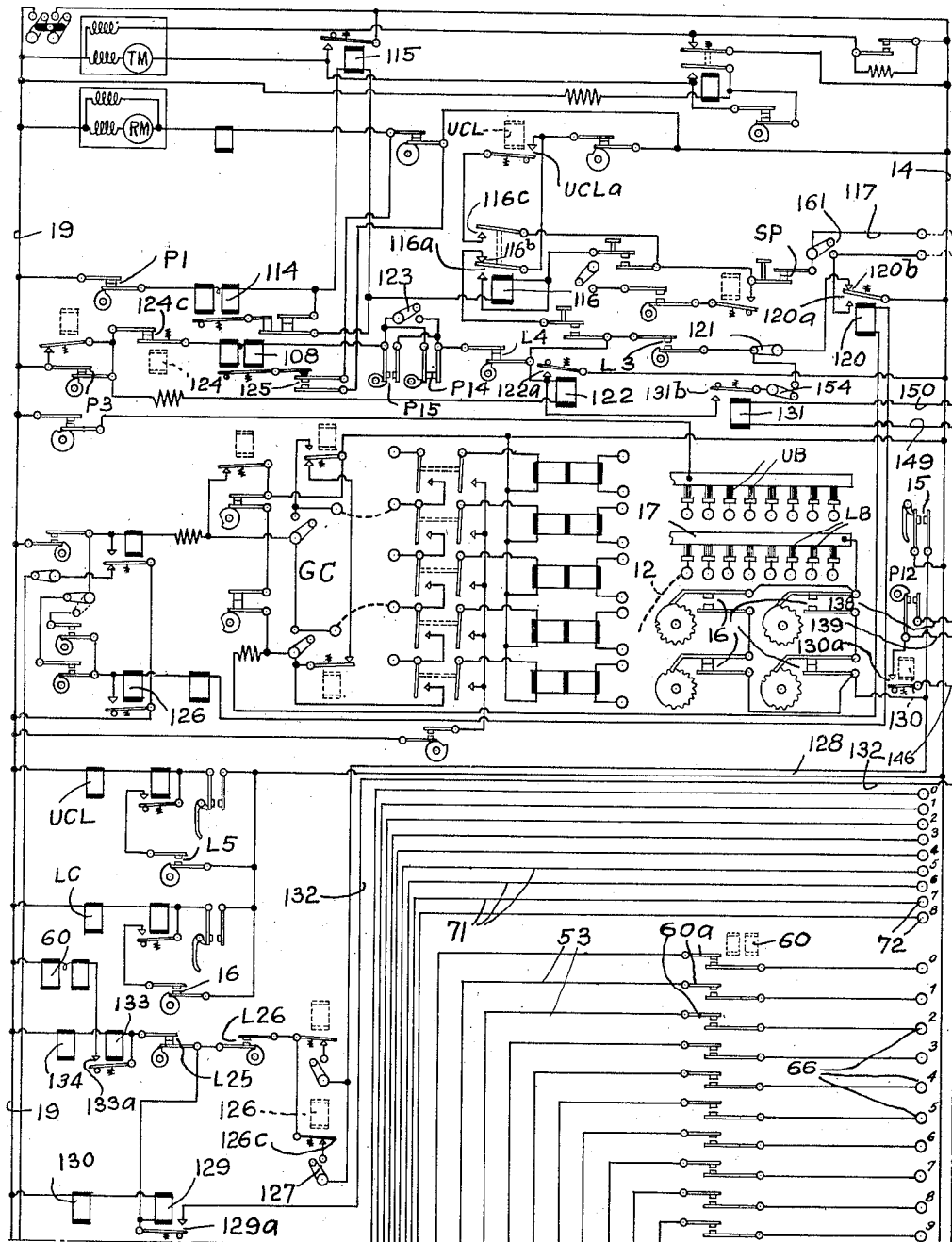
Figure 7A:
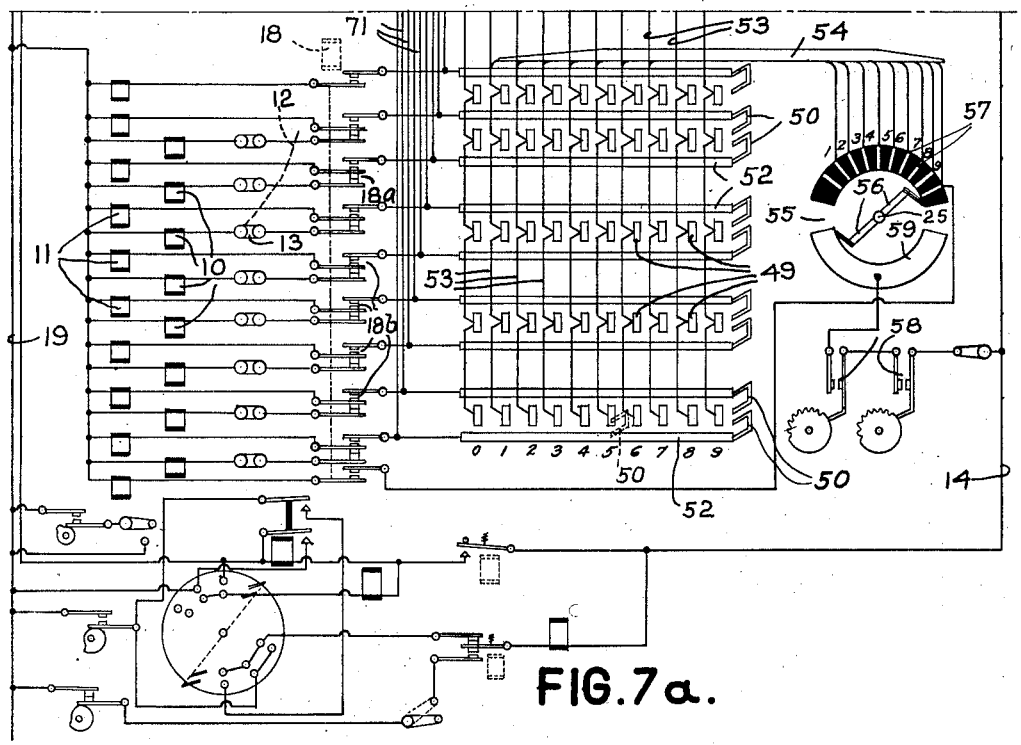

Figs. 7 and 7a, placed one above the other, constitute a wiring diagram of the electrical connections of the tabulator.

Figure 8:
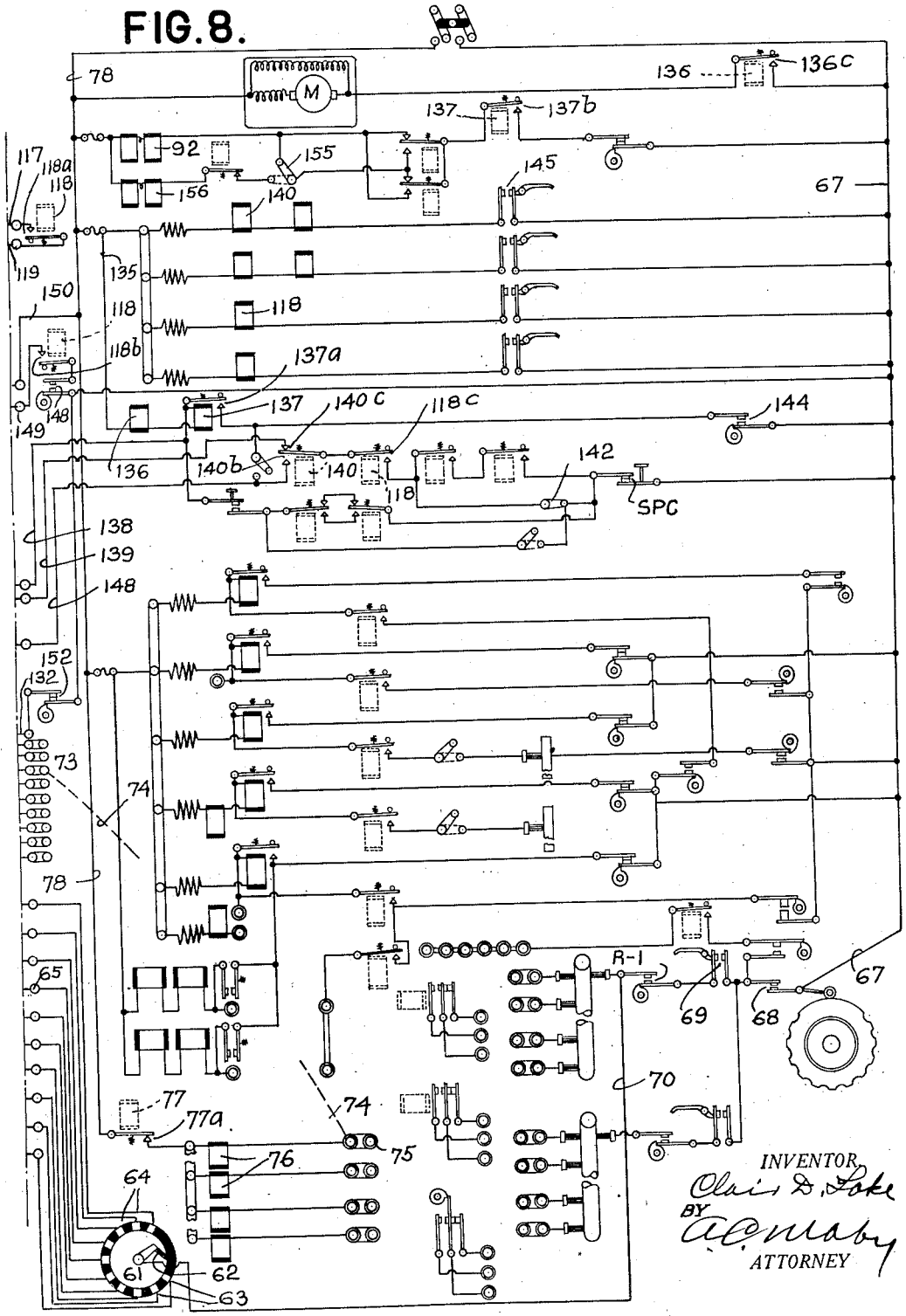

Fig. 8 is a wiring diagram of the electric circuits of the punching machine.

The two units of the apparatus comprise a tabulating machine which is of the general type shown in the copending application of C. D. Lake and G. F. Daly, Serial No. 672,388, filed May 23, 1933, now Patent No. 1,976,617, granted October 9, 1934, and a punching machine of the type shown and described in the copending application of C. D. Lake, Serial No. 685,379, filed August 9, 1933, now Patent No. 2,032,805, granted March 3, 1936. These copending applications illustrate and explain in more extensive detail the manner of organization and mode of operation of the various units of the tabulating machine and the card punching machine. In the present application, these mechanisms will be explained in only as much detail as will be necessary to set forth the manner in which the objects of the invention may be realized.

Tabulating machine operation

In Figs. 7 and 7a is shown the wiring diagram of the tabulating machine. During card feeding and analyzing operations the machine is driven by the tabulating motor TM which is controlled by a group of circuits including relays and cam operated contacts and during total taking operations the machine is driven by a motor RM which is also controlled by relays and cam controlled contact devices which are illustrated in the upper portion of Fig. 7. During the operation of the motor TM the usual perforated cards will feed successively past a set of upper analyzing brushes UB and then past lower analyzing brushes LB. As they pass the latter, the items represented by the perforations may be entered into accumulators represented by accumulator magnets 10 (Fig. 7a) and printed under control of printing magnets 11.

The cards continue to feed and the successive items continue to be entered as long as certain classification holes do not change, this being taken care of by the usual group control mechanism generally designated GC. On a change in the group classification perforations, the group control system interrupts accumulating and item printing. During the ensuing total taking operations, printing is controlled by the read-out devices of the accumulators and this same read-out mechanism will control the operation of the punching machine to perforate a record card in accordance with the total standing on the accumulator in a manner to be more fully explained.

Each card column contains ten index point positions differentially located to represent the ten digits and a different digit is represented by a perforation in each position. As the card passes the lower brushes LB the position of its index points determines the time of closure of circuits. As each record column passes its lower brush LB a printing circuit will be completed upon the analysis of a hole which is traceable as follows: from the right side of line 14, through lower card lever contacts 15 (Fig. 7), contact devices 16, lower brush contact bar 17, perforation in the record card, a plug connection such as, for example, 12 which extends to a socket 13 on Fig. 7a, normally closed contacts 18a, printing magnet 11 to left side of line 19. This is the normally effective printing circuit. A parallel circuit may also extend from socket 13 through accumulating magnet 10 whereby the same amount will be added as well as printed.

Figure 1:
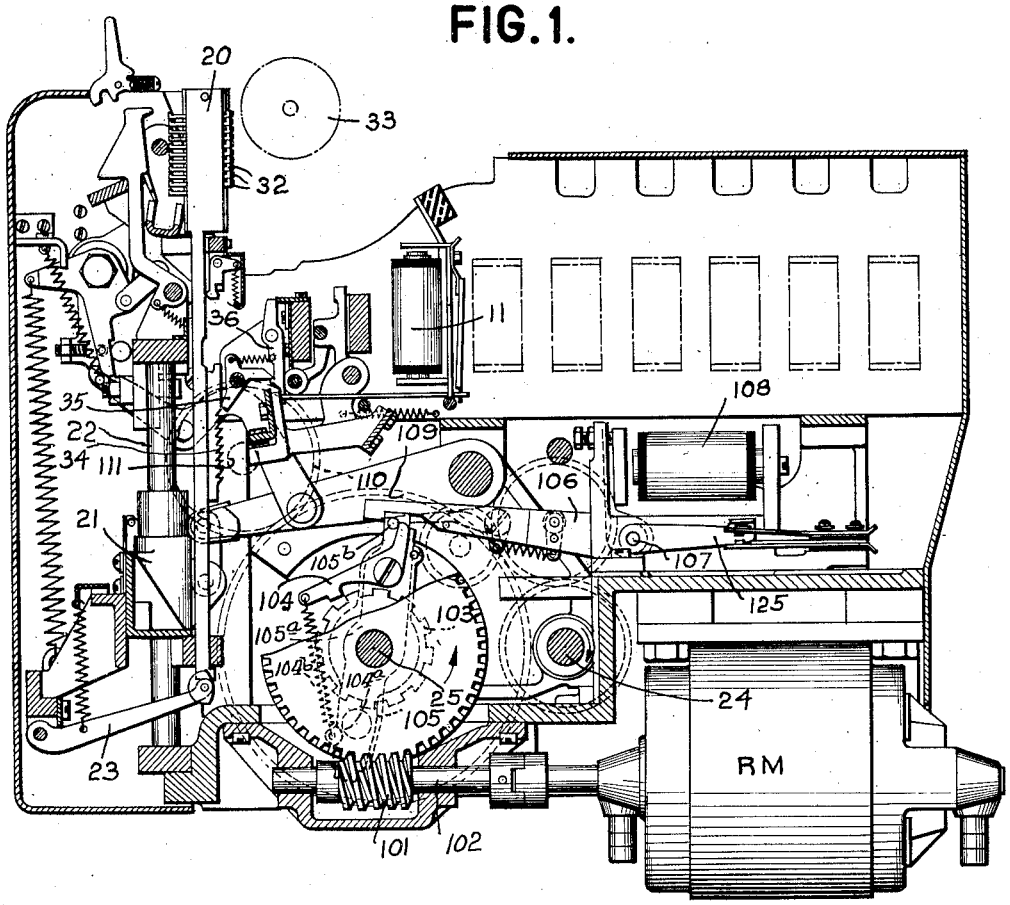
Fig. 1 is a central section through the total printing unit of the tabulating machine.

The mechanism controlled by the printing magnet is shown in Fig. 1. Type bars 20 are carried by crosshead 21 which is slidable vertically on rods 22. The spring-pressed arms 23 pivoted to the crosshead have their free ends abutting the lower extremity of the type bars so that as the crosshead moves upward, the type bars are urged in the same direction. The reciprocating movement of the crosshead is controlled during adding and listing operations from the listing shaft 24 and during total taking operations from the total taking shaft 25 which shafts carry suitable cams for operating the mechanism. As the type bars move upwardly, the type elements 32 will successively pass printing position opposite platen 33 and ratchet teeth 34 will successively pass the nose of the stop pawl 35. Energization of magnet 11 will trip latch 36, permitting stop pawl 35 to engage one of the ratchet teeth 34, thus positioning the corresponding type element opposite the platen.

The mechanism controlled by adding magnet 10 is shown in Fig. 4. This adding mechanism is of the well-known Hollerith type and its operation, briefly, is as follows:

A shaft 37 is driven in the usual manner with the card feeding mechanism so as to make one revolution for each card passing through the machine. Attached to shaft 37 and rotating therewith are clutch elements 38 which are shiftable along the shaft to engage the other faces 39 of the clutches. These latter elements are integral with gears 40 which mesh with gears 41 associated with the usual numeral or index wheels 42 freely carried on shaft 43. Each clutch element 38 is normally urged towards its related element 39 by a pivoted lever 44 which is urged in a counterclockwise direction by a leaf spring 45.

Movement in this direction is normally prevented by an armature latch 46 which engages a block 47 to hold the arm 44 in the position shown in Fig. 4. When magnet 10 is energized, the latch 46 is released and the driving element 38 engages 39 to cause rotation of the index wheel 42. At the end of each revolution of shaft 37 the clutch 38 is mechanically disengaged in the usual manner so that the amount of rotation imparted to the index wheel 42 is dependent upon the time in the cycle at which magnet 10 is energized. Thus, if magnet 10 is energized at the "5" time, wheel 42 will be advanced five steps before the clutch is disengaged.

Associated with each adding wheel is a total read-out device which consists of a commutator 48 provided with segments 49 corresponding in number and position to the several digit indicating positions of the index wheel. A brush structure 50 is carried by and insulated from a gear 51 meshing with gear 40 so that the brush structure 50 is angularly displaced an amount corresponding to the reading on the numeral wheel. The structure carries two brushes, one of which engages the segments 49 and the other engages a common segmental conductor 52 whose contacting surface is concentric with the supporting shaft of gear 51. The segments 49 and conductors 52 are diagrammatically represented in developed form in the circuit diagram, Fig. 7a.

Each group of segments 49 corresponding to the same digit is connected to a common conducting wire 53 whereby all the "9" segments are in multiple, all the "8" segments are in multiple, and so on.

The wires 53 have a branch extending through a cable 54 to an emitter 55, shown diagrammatically, which is driven in synchronism with the movement of the printing crosshead during total printing operations. This emitter consists of a double brush structure 56 which may be mounted on the total taking shaft 25 of Fig. 1. One of the brushes 56 is adapted to successively contact with the segments 57 as the correspondingly numbered type elements pass through printing position during total taking operations. Each segment 57 is connected to the correspondingly numbered wire 53 through the cable 54. Hence it will be understood that each of the commutator segments 49 receives a timed impulse from the emitter at the time when the type corresponding to the wheel setting is passing the printing line and in the order 9, 8, 7 . . . 3, 2, 1.

During total taking operations a relay magnet 18 (Fig. 7a) is energized to connect the common conducting strips 52 to the corresponding printing magnets 11 by causing closure of contacts 18b. A representative circuit will now be traced to illustrate the manner in which the printing mechanism may be actuated from the total taking devices. Assuming the digit "5" to be set on one of the commutators 49, 52; during the total taking cycle as the brushes 56 of the emitter 55 rotate in synchronism with the operation of the printing mechanism, a circuit will be completed from right side of line 14, contacts 58, common segment 59, brushes 56, "5" segment 57, cable 54, "5" wire 53, "5" segments 49, brush structure 50 (dotted in the units order position of Fig. 7a), common conductor 52, contacts 18b, print magnet 11, to left side of line 19. In this manner the value standing on the read-out device of the accumulator will be printed.

The operation of the tabulating machine thus far described is exactly as set forth in the Patent No. 1,976,617 referred to. For the purposes of the present invention the wires 53 extend to normally open relay contacts 60a which are controlled by a magnet 60. Magnet 60, as will be explained hereinafter, is energized during total taking operations and controls the completion of the circuits through the punch operating magnets of the punching machine.

*Total punching circuits*

Referring to Fig. 8, the punch is provided with an emitter 61 whose brush 62 traverses segments 63 whenever the punching machine is in operation. Wires 64 extend from segments 63 to sockets 65 of the punch, from whence connections may be made to sockets 66 (Fig. 7) of the tabulating machine. The timing of the apparatus is such that the emitter 55 sends a succession of impulses to the segments 49 for total printing purposes and thereafter the emitter 61 sends a second set of impulses to the segments 49 for total punching purposes. A representative punching circuit will now be traced in detail. Assuming the same digit "5" in the units order to be set on the appropriate commutator, this circuit extends from right side of line 67 of the punching machine (Fig. 8) to circuit breaker 68, card lever contacts 69, cam contacts R1, closed during the period that the index point positions of the cards are analyzed in the punching machine, which is the period during which the card to be punched passes the punches 83, wire 70, emitter brush 62, "5" segment 63, "5" wire 64, socket 65, suitable connection to socket 66 (Fig. 7), contacts 60a, "5" wire 53, "5" segments 49, brush 50 in the "5" position of the units order, common conductor 52, wire 71, to one of the sockets 72 from which suitable connections are made to sockets 73 (Fig. 8) of the punching machine. From the socket 73, plug connections, such as 74 are made to selected sockets 75 and the circuit continues to the punch magnet 76 and thence through relay contacts 77a to the left side of line 78 of the punching machine.

The cam controlling contacts R1 are carried by shaft 200 (Fig. 3) which makes one revolution for each card fed. This shaft corresponds to shaft 91 of Patent No. 2,032,805 and is driven in the same manner.

The manner in which the timed energization of the punching magnet causes punching in the "5" index point position of the selected column of the summary card will be set forth in detail later. The several connections made between the tabulating and punching machines, as, for example, those between the sockets 65, 66 and 72, 73 as well as several others to be further referred to, may be gathered into a single connecting cable for ready interconnection of the two machines.

*Punching machine operation*

Referring to Fig. 2, the hopper 80 contains blank cards which are to receive the summary punching in accordance with the amount standing on the accumulators of the tabulating machine and a second hopper 81 contains pattern cards which are perforated with other data which it is desired to reproduce in the summary cards along with the punching of the total amounts. When the machine is conditioned for reproducing, the record cards are fed in synchronism from the two hoppers. As they are fed, a pattern and associated blank card are simultaneously placed in related feed rollers and then moved along concurrently and in synchronism, the blank card having an intermittent movement. The pattern card passes a sensing station where the perforations therein are analyzed by analyzing brushes 82 and the blank card passes a punching station where punches 83 register with the index point positions of the card. The blank cards pause momentarily at each index point position so that if a perforation is to be effected, the punch has time to penetrate and withdraw from the punched card.

The pattern card is sensed at each line of index points and if a perforation appears, a circuit is established through a selected one of the punch controlling magnets 76, the armature of which is connected by a call wire 84 to an interposer pawl 85 articulated on the upper end of the punch plunger 83. The pawl 85 has a shoulder normally out of the path of a positive actuator 86 which is reciprocated once for each row of index point positions sensed. When a magnet 76 is energized, it draws its associated pawl 85 into engagement with the actuator 86 which engagement is effected as the actuator is lowered and it is thus picked up and forced downwardly to cause the associated punch to penetrate the record card. On the return movement of the actuator, the pawl 85 is moved upwardly and disengaged from the actuator by a fixed camming element 87.

The driving instrumentalities of the punching machine are shown in Fig. 3 wherein the main driving motor M is connected by a suitable belt and pulleys for rotation of a shaft 88. Fixed to the shaft 88 is a gear 89 which serves to drive the constantly running devices of the machine. Gear 89 through gearing generally designated 90 drives a clutch element 91 which under control of a clutch magnet 92 is adapted to drive gearing 93 which in turn, through the gears indicated, operates the sensing unit of the machine to feed a blank card from hopper 80 for each cycle of the machine.

Gear 89 carries a pin 94 for operating a Geneva wheel 95. Integral with wheel 95 is a gear 96 from which the feed rollers for conveying the summary card past the punching station are operated. In this manner, they proceed past the punches 83 with a step-by-step motion. In Fig. 2 the shaft 88 carries an eccentric 97 which through arms 98 is adapted to rapidly oscillate shaft 99 which has connection to the vibrating actuator 86. The relationship of the parts is such that for each row of punching positions in the card presented to the punches 83 there will be a reciprocation of the actuator 86 and if a magnet 76 is energized at such time, the associated pawl 85 will be coupled to the actuator and a perforation in the record card will result.

After a record card has been moved past the punches it encounters a set of analyzing brushes 100 which may sense the perforations just effected and complete circuits to energize magnets 76 to reproduce the punchings in the next following record card. Generally speaking then, the punching magnet 76 may be energized under control of analyzing brushes 82 which read perforations in the pattern cards or under control of analyzing brushes 100 which read perforations in preceding punched cards. These two methods of controlling the magnet 76 are more fully dealt with in the copending application, Serial No. 685,379. For the purposes of the present invention, the magnet 76 may be further energized under control of the read-out devices of the accumulators of the tabulating machine and such control may obviously be in conjunction with, or independently of, concurrent control of other magnets 76 by either brushes 82 or brushes 100.

Figure 1A:
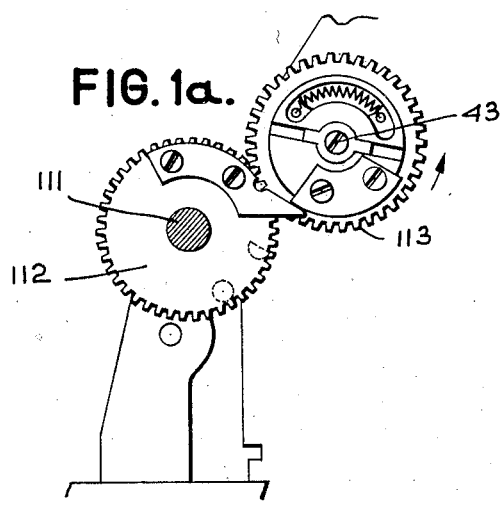
Fig. 1a is a detail showing the accumulator resetting gear connection.

Referring now to Fig. 1, the motor RM is in operation during total taking operations and through worm 101 and worm wheel 102 drives clutch element 103 freely mounted on the total shaft 25. Associated with the element 103 is the clutching dog 104 carried at one end of an arm 105, either extremity of which may be engaged by clutch arm 106 pivoted at 107 and controlled in its operation by reset magnet 108. Energization of magnet 108 will release dog 104 for engagement with driving element 103 at which time the parts will be in the position shown in Fig. 6. If magnet 108 is then deenergized, the dog 104 will be disengaged after shaft 25 has made a half revolution due to the engagement of arm 106 with the opposite end of arm 105. More specifically, an arm 105a is fixed to shaft 25 and carries pawl 104. Adjacent to arm 105a is a somewhat similar arm 105 loose on shaft 25 and free to move within the limits of a pin and slot connection 104a with the arm 105a. The pawl 104 is drawn into engagement with ratchet 103 by spring 104b connected to the arm 105a. The rear end of pawl 104 engages a pin 105b on the arm 105 and through the power of spring 104b passes the arm 105 ahead of arm 105a a distance equal to the amount of play in the pin and slot 104a. When the magnet 108 is deenergized, the arm 106 is drawn by its spring into the path of the rotating arms 105, 105a. The arm 105 being slightly in advance engages arm 106 first and is stopped while the other parts tend to continue to turn. This relative movement causes pin 105b to press against the rear end of pawl 104, lifting the latter out of engagement with the ratchet 103. This breaks the coupling and as soon as this has taken place the arm 105a also engages arm 106 and shaft 25 is brought to a positive stop. This mechanism constitutes a well known form of half revolution clutch shown in detail at Fig. 1a of Patent No. 1,822,594 and is utilized in the present machine to interrupt the total taking operation of the tabulator at its mid point, before resetting of the accumulators is initiated. Shaft 25 carries a mutilated gear 109 which is adapted to drive gear 110 on shaft 111 during the second half revolution of the total shaft 25. Shaft 111 (Fig. 1a) carries gears 112 which drive gears 113 carried on the extremity of the accumulator index wheel shafts 43 and rotation of gears 113 in a counterclockwise direction will effect restoration of the accumulator wheels by advancing them to zero position.

*Wiring diagram*

The complete automatic operation of the entire apparatus will now be set forth in connection with the electric circuits thereof and the complete sequence of operations will be explained insofar as it is necessary to point out the changes over prior machines.

With groups of record cards placed in the supply hopper of the tabulating machine and blank cards placed in the hopper 81 of the punching machine, the tabulator may be started in the usual manner to successively feed record cards past the analyzing brushes so that the data thereon may be printed and accumulated through the listing and adding circuits representatively traced above. During such adding and listing cycles of operation, the driving elements of the machine are maintained in operation by the following circuit which extends from the left side of line 19 in Fig. 7, through contacts P1, main drive clutch magnet 114, motor relay magnet 115, relay magnet 116, contacts 116a, contacts UCLa, contacts 116c, stop key contacts SP, wire 117, which extends through suitable plug connection to the punching machine (Fig. 8), relay contacts 118a, which are closed when cards are in the magazine 81, wire 119, through suitable plug connection back to the tabulating machine, relay contacts 120a, to right side of line 14. Contacts 120a are closed at this time through the energization of motor control relay magnet 120 which remains energized as long as control designations on successively fed record cards are in agreement and which, under control of the group control mechanism GC, becomes deenergized when a change occurs and remains deenergized until total taking operations have been effected. Therefore, upon a group change, the deenergization of magnet 120 will open contacts 120a to interrupt the normal drive controlling circuit just traced and card feeding and data entering operations will cease.

The consequent closure of contacts 120b will initiate the usual total taking operation by completing a circuit traceable from the right side of line 14, contacts 120b, automatic reset switch 121, cam contacts L3, relay magnet 122, cam contacts P3, to left side of line 19. Relay 122 will close its contact points 122a to complete a circuit from line 14, contacts 122a, cam contacts L4, contacts P14, reset clutch magnet 108, normally closed relay contacts 124c, cam contacts P3, to line 19. Magnet 108 will close a pair of associated contacts 125 which complete the circuit to reset motor RM and since energization of magnet 108 has tripped its clutch the total shaft 25 will rotate for a half revolution and then come to a stop. Contacts P14 open shortly after the total taking cycle begins so that magnet 108 will be deenergized and its armature will return to position to reengage the clutch arm. During this half revolution the type bars will be elevated and total printing will take place under control of the read-out commutators of the accumulator through circuits as traced above.

When the tabulating machine is to be operated independently of the punching machine, switches 161 and 123 are closed. The former shunts out relay contacts 118a of the punch and the latter shunts out contacts P14 and P15 in the reset circuit so that the circuit will remain energized until contacts P3 open. These contacts are timed to open during the second half of the total taking cycle so that, when tabulating without accompanying operation of the punch, the total cycle is effected in one continuous revolution of total shaft 25.

Connected in series with the motor control relay 120 is a minor control relay magnet 126 which controls a pair of contacts 126c in the lower part of Fig. 7 which are accordingly open as long as successive cards are in agreement and which close upon a group change so that with switch 127 closed, a circuit will be completed upon a group change which is traceable from line 14, card lever contacts 15, wire 128, switch 127, contacts 126c, contacts L26 (which close momentarily during each adding cycle), relay magnet 129 and 130, to line 19. Magnet 129 will close its contacts 129a to provide a holding circuit from line 19 to magnets 130 and 129, contacts 129a, wire 132, connection to the punch (Fig. 8), cam contacts 152 (closed when the punching machine is at rest) to line 67. Contacts 152 remain closed during the punching operation and open momentarily after all index point positions have passed the punching station. Contacts 152 are controlled by a cam mounted on the shaft 200 (Fig. 3). Upon closure of contacts 129a a further circuit is also traceable from line 19, relay magnets 134, 133, contacts L25 (timed to close after L26 have opened), contacts 129a, wire 132 (Fig. 8), contacts 152, to line 67. Magnet 133 will close its contacts 133a so that the circuit will branch therethrough to energize magnet 60 which, as explained above, will cause closure of a group of contacts 60a which serve to connect the read-out device 49, 50, 52 of the accumulator in the tabulating machine to the emitter 61 of the punching machine. Contacts L25 are adjusted to remain closed during total taking operations so that a holding circuit is provided for magnet 60 which is traceable from line 19, magnet 60, contacts 133a, contacts L25, contacts 129a, wire 132, contacts 152 (Fig. 8) to line 67. This circuit will remain established until punching of the total has been effected.

Just before the completion of the first half revolution of the total shaft 25, a pair of cam contacts P12 (shown at the right hand side of Fig. 7) close momentarily and complete a circuit which is traceable from line 78 (Fig. 8) through wire 135, motor relay magnet 136, relay magnet 137, wire 138, through suitable connection to the tabulating machine (Fig. 7), thence through contacts P12, wire 139 (Fig. 8) normally closed relay contacts 140c, contacts 118c, switch 142, now closed, stop contacts SPC, to right side of line 67. The contacts 118c in this circuit are closed by energization of magnet 118 which is energized as long as there are cards in the punch supply magazine. Energization of motor relay magnet 136 will close its contacts 136c (shown in the upper part of Fig. 8) to complete the circuit to the punch driving motor M and the punching machine will thus be placed in operation and with clutch magnet 92 energized, the card feeding mechanism will be enabled to advance a blank record card from the magazine past the row of punches 83. Relay magnet 137 closes its contacts 137b to energize magnet 92. Relay magnet 137 will close its contacts 137a to provide a holding circuit through cam contacts 144 which close soon after the punching machine has commenced to operate. As the card to be punched enters the punch die, a pair of card lever contacts 145 in the upper part of Fig. 8 close, completing the circuit including relay magnet 140. This will cause opening of the contacts 140c and closure of contacts 140b so that a further holding circuit for the punching machine operating circuits becomes established which is traceable as follows: from left side of line 78 (Fig. 8), wire 135, magnet 136, magnet 137, wire 138 (Fig. 7), cam contacts P12, now closed, relay contacts 130a, also closed, wire 148 (Fig. 8), relay contacts 140b, contacts 118c, switch 142, stop key contacts SPC, to line 67.

During the operation of the punching machine the emitter 61 will operate to send a succession of impulses through wires 64 to the read-out devices of the accumulator and circuits as previously traced will be completed to the punching magnets 76, at times in synchronism with the presentation of the successive index point positions to the punches.

It may be called to attention at this point that the emitter 61 sends out impulses over wires 64 in the order 0, 1, 2, 3, . . . 7, 8, 9 and that the index point positions of the record cards are presented to the row of punches in this same order. Referring to Fig. 4 it will be observed that the brush structure 50, when reset, is advanced in a counterclockwise direction to traverse the segments 49 in the orders 1, 2, 3, . . . 7, 8, 9 since during reset operations the shaft 43 is given a complete rotation in a counterclockwise direction and the axial notch therein will engage pawls 147 (Fig. 4a) to rotate the associated index wheels 42 back to zero position. It will be observed that for those orders in which an entry is made the pawl 147 will have been displaced in a counterclockwise direction away from the notch a distance proportional to the entry so that during resetting the shaft will not pick up the pawl until it has covered the interval of displacement. Since punching takes place in the orders 1, 2, 3 . . . 7, 8, 9, resetting may take place shortly after punching has commenced. Thus, for example, when the punching circuit has been completed to a brush structure 50, the same may shortly thereafter be picked up to begin its counterclockwise rotation toward home position and complete restoration of all brushes will be effected shortly after all positions have controlled their respective punching circuits. With such construction the punching machine motor M and the resetting motor RM may have such speeds of operation as will cause the punching machine to complete its cycle slightly before the resetting cycle is completed or the punch mechanism may complete its operation considerably before the resetting is complete. The latter arrangement is found to be more practical since the punching mechanism is comparatively light and can consequently be run at much higher speed than the resetting mechanism.

The circuits for initiating the operation of the resetting devices will now be explained. Shortly after the emitter 61 has commenced operation, a pair of cam contacts 148 (Fig. 8) will close and a circuit will be completed from right side of line 67 (Fig. 8) through contacts 148, relay contacts 118b, closed as long as cards are in the punch magazine, wire 149, connection to Fig. 7 relay magnet 131, wire 150 (Fig. 8) to line 78. Magnet 131 will close its contacts 131b which permit the completion of a circuit traceable from line 14, relay contacts 120b, now closed, switch 121, a switch 154, contacts 131b, relay magnet 122, contacts P3, to line 19. Energization of relay magnet 122 will initiate a further operation of the reset clutch magnet 108 through contacts P15 which are now closed, releasing the total shaft so that it may complete its revolution during which the mutilated gear 109 of Fig. 1 will drive the reset shaft 111 to cause restoration of the accumulators. After all positions have been punched, contacts 152 (Fig. 8) open to release the holding circuit of magnet 60 thereby disconnecting the read-out from the punch magnets. During this half revolution the group control mechanism GC is again set up in the normal manner and the motor control relay 120 is again energized so that automatic card feeding, analyzing, and item printing and accumulating of data will take place from the next succeeding group of record cards in the normal manner.

If switch 155 (Fig. 8) is moved to its "On" or dotted line position, clutch magnet 156 will be energized concurrently with magnet 92 and pattern cards will be advanced past their analyzing brushes 82. Circuits will therefore be completed to magnets 76 to punch data derived from the pattern cards along with the data derived from the accumulator. Magnet 156 is shown in dotted outline in Fig. 2 and trips the clutch mechanism also indicated in dotted outline to cause operation of the picker mechanism associated with hopper 81.

In Fig. 5 is shown a fragment of a summary card in which the data under the heading "Total" is punched under control of the accumulator while the data headed "Acct. No." is punched under control of a pattern card.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is as follows:

In a machine of the class described, a denominational order of an accumulator, a readout device controlled thereby including a plurality of stationary segments, one for each digit and a brush positionable by the accumulator order to contact the segment representing the digit standing in said order, punching mechanism operative to punch in the order 0, 1, 2, 3, 4, 5, 6, 7, 8, 9, means to send an electrical impulse to each segment in succession in said order to cause completion of a circuit for controlling said punching mechanism through the segment at which said brush is positioned, and means for advancing said brush toward zero position after a circuit has been completed therethrough and before an impulse is sent to the next segment.

CLAIR D. LAKE.